United States Patent [19]

Di Lorenzo

[11] 4,282,977

[45] Aug. 11, 1981

[54] END THREADED LOCKING DEVICE AND METHOD FOR USING SAME

[76] Inventor: Eugene L. Di Lorenzo, c/o Louis A. Tirelli, 52 S. Main St., Spring Valley, N.Y. 10977

[21] Appl. No.: 960,824

[22] Filed: Nov. 15, 1978

[51] Int. Cl.³ .............................................. A47F 7/28
[52] U.S. Cl. ..................................... 211/74; 211/189; 403/48
[58] Field of Search ..................... 211/74, 182, 37, 36, 211/189, 133, 42, 34; 248/165; 403/48, 296

[56] References Cited

U.S. PATENT DOCUMENTS

| | | | |
|---|---|---|---|
| 345,290 | 7/1886 | Evans | 403/48 |
| 1,032,385 | 7/1912 | Douglass | 211/42 X |
| 1,571,623 | 2/1926 | Chartoff et al. | 211/71 |
| 2,152,192 | 3/1939 | Hoffman | 211/34 |
| 2,599,380 | 6/1952 | Galvin | 211/133 |
| 3,022,897 | 2/1962 | Archer et al. | 211/36 |
| 3,341,162 | 9/1967 | Ruchlis | 248/174 |
| 3,974,917 | 8/1976 | Waxmanski | 211/36 |
| 4,148,427 | 4/1979 | Baker | 248/174 X |

FOREIGN PATENT DOCUMENTS 310603 5/1929 United Kingdom ...................... 211/34

*Primary Examiner*—Roy D. Frazier
*Assistant Examiner*—Robert W. Gibson, Jr.
*Attorney, Agent, or Firm*—Louis A. Tirelli

[57] ABSTRACT

A joining device for quickly and easily connecting together furniture, shelving, display items and other like articles which includes a dowel piece having both ends turned down and threaded at opposite ends in opposite directions, and includes in combination therewith internally threaded keepers for holding in position desired standards with preformed apertures therein when the latter are each fitted onto opposite ends of the dowel through the predrilled openings, the keepers being tightened first onto the threaded portion of one side of the dowel after inserting in the first of the pair of standards and then the remaining keepers are tightened on the opposite end of the dowel when it has been inserted through the preformed apertures in the second of the pair of standards. The application also includes the method for use of the same.

1 Claim, 16 Drawing Figures

U.S. Patent   Aug. 11, 1981   Sheet 1 of 3   4,282,977
FIG. 1.
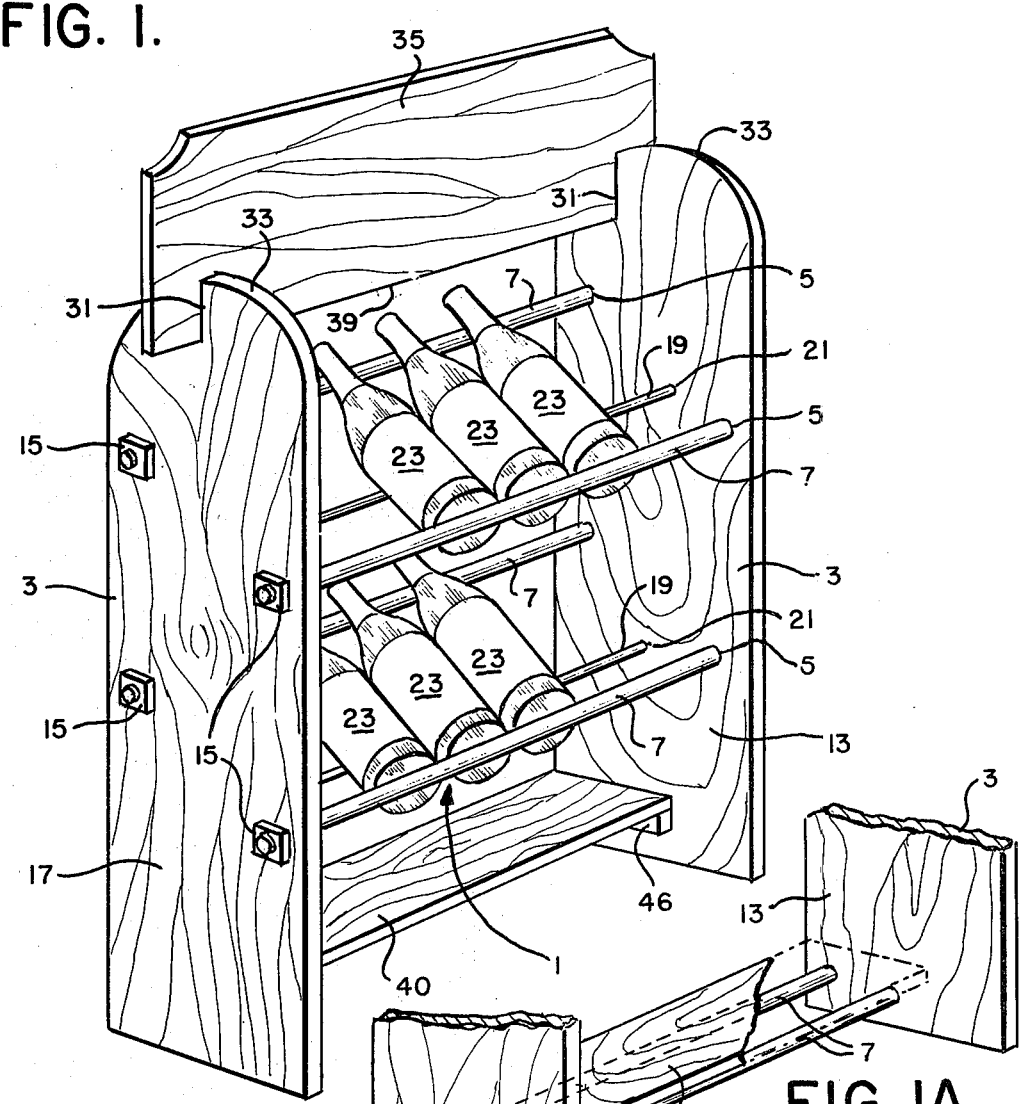
FIG. 1A.
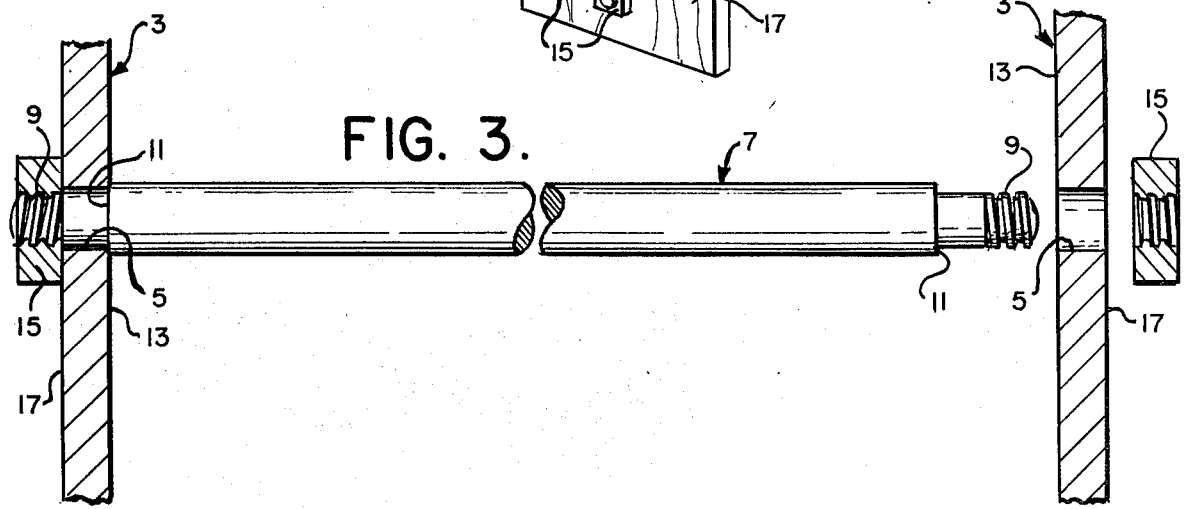
FIG. 3.

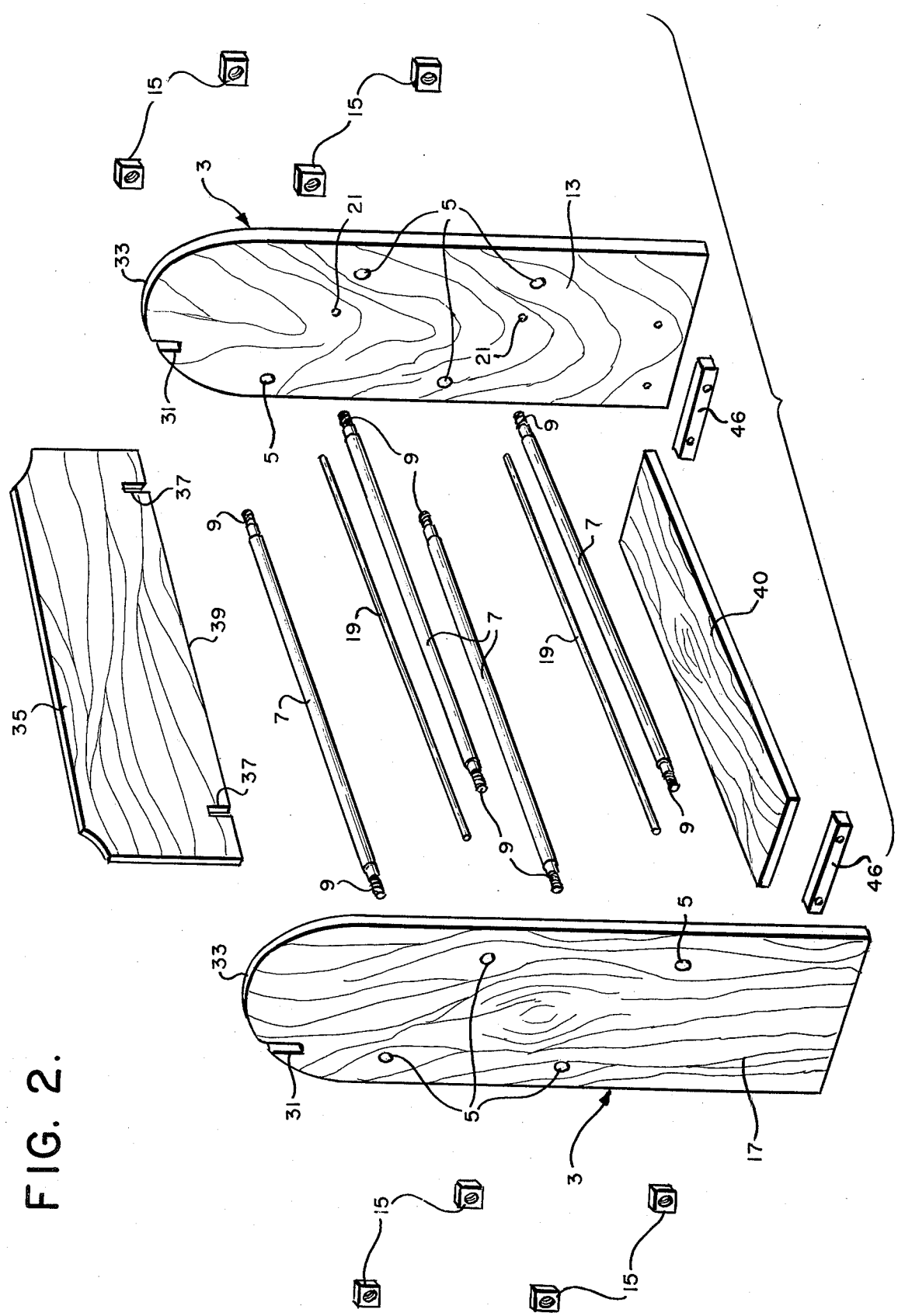

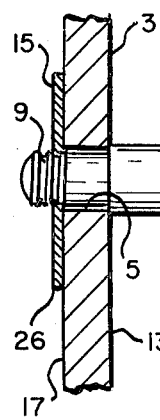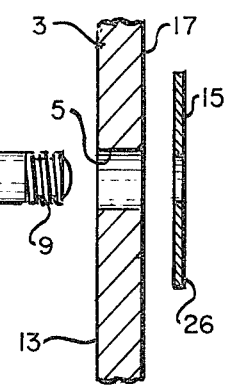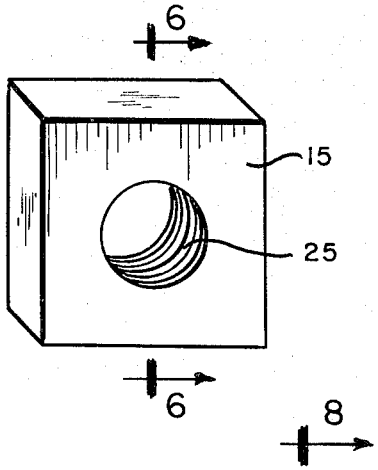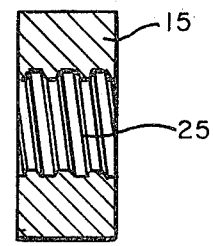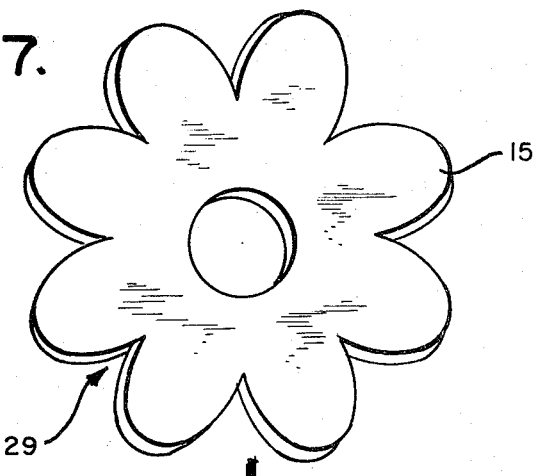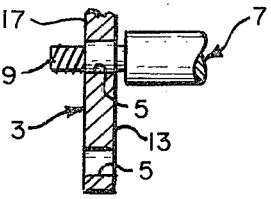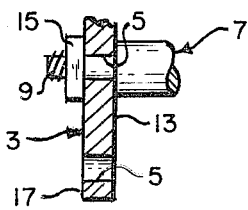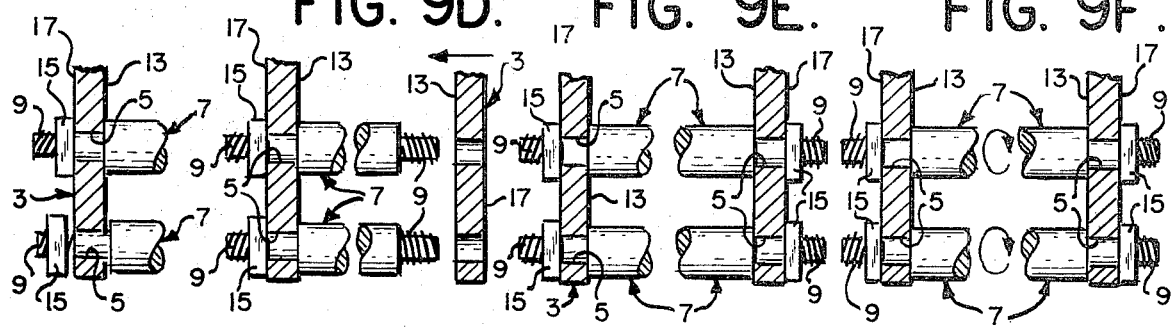

END THREADED LOCKING DEVICE AND METHOD FOR USING SAME

BACKGROUND OF THE INVENTION

This invention relates generally to a device for quickly and easily connecting together furniture, shelving, display items and other like articles and to a method of performing the same.

In the prior art, although it was known to connect together for example shelf supports, protectors for brick fire places and the like, nowhere was the problem approached of quickly connecting together furniture, shelving, display items and other like articles in an easy straightforward manner without requiring the assistance of an additional man to accomplish the task.

For example, U.S. Pat. No. 431,745 (Haven) describes a shelf support constructed of pipe sections which shelf support is capable of adjustment to any required height or distance between shelves. Moreover, the pipe sections are reversely screw threaded for threading into two or more sleeves in order to regulate the distance between shelving. Nowhere does Haven describe an inexpensive device capable of quick construction.

Another example of a coupling means of the prior art in U.S. Pat. No. 2,581,032 (Landsman). Landsman describes a coupling means for a garment hanger rack, which includes bent tubular sections. Landsman further describes connecting together tubular sections having a continuous outer surface of equal dimensions by means of an internal coupling member. The internal coupling member is externally and oppositely threaded on each end and fits within an outer coupling member and engages on each end to internally threaded sandwiching outer tubular members. The internal coupling member is turned within the outer coupling member to draw the internally threaded sandwiching outer tubular members toward each other and against either end of the outer coupling member to make a continuous outer tubular rack. Landsman is complex, expensive to produce and difficult to manufacture and fabricate.

A similar item for a rod for an electric wire connector is U.S. Pat. No. 461,452 (Scrugham). Scrugham describes an oppositely threaded rod which screws into internally threaded clamps each connected to conductors of electricity for a trolley system. The rod is rotated to draw the conductors together. Scrugham is limited to electric wire conductors since it is complex and involves an external coupling which is unasethetic and inapplicable to shelving.

U.S. Pat. No. 3,834,549 (Burg) describes a similar structural system for use in commercial window decorations, which is complex and expensive to manufacture.

Another similar item for connecting a protector for a brick fire place is described in U.S. Pat. No. 367,154 (Meharg). The protector of Meharg is adjustable in size by means of screws which are oppositely threaded on each end and are fitted into internally-threaded standards. The standards are drawn together by turning the screws and the protector can thereby be reduced in width. Meharg is strictly limited to varying the size of a protector for a brick fire place and is not applicable to shelving or furniture.

Finally, a steel rod-straining device is described in U.S. Pat. No. 3,743,330 (Itatani). Itatani is only used to cause a strain on a steel rod being used for reinforcement in a building or other structure and is not applicable to furniture, shelving or display items.

Various bottle racks and display racks are known in the prior art. An example of one such bottle rack is U.S. Pat. No. Des. 180,883 (Perry). An example of a display rack which is adjustable and slidably connected together without the use of hardware is U.S. Pat. No. 3,550,786 (Brown). Brown uses a frictional fitting together of parts.

What is desired is a joining device which will allow a workman to quickly and easily erect a structure or free standing fixture on the spot and without additional help. This is especially necessary with today's economy where the cost of labor is very high. Specifically, a need is known in the commercial store display area where a man travels from store to store to erect fixtures which must be transported in an automobile and of need must travel compactly and erect quickly with a minimum of labor.

The present application solves this problem in a novel and heretofore unobvious manner which will be described below.

BRIEF SUMMARY OF THE INVENTION

In accordance therewith, the present invention provides a joining device for quickly and easily connecting together standards which comprises a pair of standards having corresponding preformed apertures therein, at least one dowel having both ends threaded at opposite ends in opposite directions and at least one pair of keepers provided for being threaded onto each end of each of the pair of dowels. Accordingly, the first one of the pair of standards is selected and has one end of each of the at least one dowels inserted through the corresponding preformed apertures provided therein. One of each of the at least one pair of keepers is screwed tight onto each of the ends of the corresponding at least one dowels which has been inserted through the corresponding preformed apertures in the selected one of the pair of standards. The second of the pair of standards is moved toward the free and opposite ends of the at least one dowels, the latter being inserted through the preformed apertures therein, and the remaining one of each of the at least one pair of keepers is screwed tight onto the corresponding free ends of the at least one dowels to butt tightly against the second of the pair of standards thereby forming a free standing fixture.

In a preferred embodiment the joining device includes batting secured along the inside face of each of the pair of standards at approximately the same height when the pair of standards are set upright. The batting provides support for a shelf when the joining device is fully assembled.

In another preferred embodiment, the joining device includes at least two dowels spaced apart for supporting at least one article. The joining device further includes a rib supported on either end in corresponding preformed cavities in the pair of standards and spaced in position with the dowels to support at least one article whereby the joining device forms a rack for supporting one or more of the articles.

In a specific preferred embodiment, the joining device forms a wine rack and includes a rib and at least two dowels in combination which are spaced apart to support the neck and base of one or more wine bottles when set thereon.

In another preferred embodiment, the joining device includes a pair of standards which are correspondingly notched at their upper portion. The joining device further includes a face board which is supported by the pair of standards in an upright position within the notches.

In a specific preferred embodiment, a joining device includes a face board which is notched at its lower portion to correspond to the notches in the pair of standards. The notches in the face board and the pair of standards interact with the face board in position to prevent the face board from sliding from its symmetrically centered position.

In another preferred embodiment, the joining device includes at least one dowel which is turned down. The dowel is then threaded in opposite directions at both ends, forming a shoulder which is disposed to butt against the inside face of the pair of standards. This holds the pair of standards in place when the keepers are threaded into position, abutting the outside face of the pair of standards.

In another preferred embodiment, the joining device includes at least one pair of keepers which are in the form of a wooden internally threaded nut.

In another preferred embodiment, the joining device includes at least one pair of keepers which are in the form of a thin sheet of hard material.

In a specific preferred embodiment, the joining device includes at least one pair of keepers which are each in the form of a thin daisy, having a concentric opening in the center thereof. This opening is slightly larger than the root diameter of the threaded portion of the at least one dowel, thereby threading an aesthetically appealing keeper onto at least one dowel.

The invention provides a method of joining together a free standing fixture, which includes selecting the first of a pair of standards having corresponding preformed apertures therein, fitting one end of at least one dowel into the preformed apertures in the selected one of the pair of standards, and threading a selected one of at least one of the pair of keepers onto the threaded end of the selected one of the pair of standards until the selected one of at least one pair of keepers fits snugly against the outside face of the selected one of the pair of standards. Repeating the step of fitting one end of at least one dowels into each successive dowel and after each successive dowel is fitted into the preformed apertures in the selected one of the pair of standards threading a successive selected one of the at least one of the pair of keepers onto the threaded end of the selected one of the pair of standards until the selected one of the successive one of the at least one pair of keepers fits snugly against the outside face of the successive one of the selected one of the pair of standards until all of the at least one dowels are both fitted and threaded. The method then provides for selecting the remaining one of the pair of standards and fitting the opposite and free ends of each of the at least one dowels into the corresponding preformed apertures in the remaining one of the pair of standards. The method further provides for selecting the remaining one of the at least one pair of keepers for each of the threaded ends of the pair of standards having been inserted through the remaining one of the pair of standards and threading the same onto the oppositely threaded free end of the at least one dowel. This last threading step takes place in a direction counter to the threading of the at least one pair of keepers performed on the end of the at least one dowel fitted through the first of the pair of standards. The method then provides for tightening securely the joining device by rotating each of the at least one dowels so that the at least one pair of keepers are each tightened against the pair of standards along the oppositely threaded ends of the at least one dowel, so that the joining device is easily erected in place.

The method further includes the step of laying a shelf on batting provided for support of the shelf. The batting is provided on the inside face of each of the pair of standards after the joining device is erected.

The method further includes the step of fixing a rib in a preformed groove in a selected one of the pair of standards prior to inserting the opposite and free end of the at least one dowel in the preformed apertures provided in the second of a pair of standards. The rib is held until the second of the pair of standards forms a support for the opposite end of the rib as the rib fits into the corresponding preformed groove in the second pair of standards.

Having briefly described the broad aspects of the present invention, it is a principle object thereof to provide an end threaded locking device which will facilitate the erection of furniture, shelving, display items and other like articles.

Another object of the present invention is to provide an end threaded locking device which will facilitate the erection of shelving, furniture, display items and other like articles quickly and easily.

A further object of the present invention is to provide an end threaded locking device which will facilitate the quick erection of a wine rack by one workman.

A still further object of the present invention is to provide a method of quickly and securely erecting furniture, shelving, display items and other like articles.

Another further object of the present invention is to provide a method of quickly erecting furniture, shelving, display items and other like articles in place by one workman.

One further object of the present invention is to provide a method of quickly erecting a wine rack by one workman.

An advantage of the herein described joining device is that a single man can fabricate the entire structure without difficulty in a very short period of time. This reduces the cost of labor, which can be a high percentage of the cost of an item such as described herein.

Another advantage resulting from the invention is the adaptability of the joining device to so many various and different structures, such as display items for store displays, furniture and the like.

A further advantage of the joining device is the strength of the structure fabricated thereby.

A still further advantage of the joining device is the ability to maintain the strength and durability of the fixture or display item but with the further additional advantage of giving an aesthetically appealing look to the structure.

Many additional objects and advantages accrue from the invention as those skilled in the art will appreciate as the invention is more fully described hereinafter.

BRIEF DESCRIPTION OF THE DRAWINGS

Other objects and advantages of the present invention will appear from the following specifications and claims, and the appended drawings which shown, by way of example, some preferred embodiments of the invention, and in which:

FIG. 1 is a perspective view of the end threaded locking device of this invention shown in connection with a pair of standards or side walls joined by dowels, with a face board at the top and forming in conjunction therewith a wine rack. A shelf is shown supported on batting.

FIG. 1A is a broken-away section of the bottom portion of FIG. 1 but with the shelf shown supported on two dowels rather than on batting.

FIG. 2 is an exploded view of the wine rack of FIG. 1.

FIG. 3 is an illustrated sectional view of the end threaded locking device of FIG. 1, showing a portion of a standard locked in place on the left side and another standard before being locked in place with a keeper in the form of a nut ready to be threaded onto the right threaded portion of the threaded locking device.

FIG. 4 is a view similar to FIG. 3, but the keepers are thin pieces of sheet metal or wood strips instead of internally threaded nuts.

FIG. 5 is a perspective view of a keeper in the form of a nut used in conjunction with the threaded locking device of FIG. 1.

FIG. 6 is a transverse section taken along line 6—6 of FIG. 5.

FIG. 7 is a perspective view of a keeper in the form of a thin piece of material in the shape of a daisy used in conjunction with the threaded locking device of FIG. 1.

FIG. 8 is a transverse section taken along line 8—8 of FIG. 7; and

FIGS. 9A through 9F illustrate the method of erection in accordance with this invention of the threaded locking device of FIG. 1.

DESCRIPTION OF THE PREFERRED EMBODIMENT

It is noted that in the drawing, similar parts of like members are given similar reference numerals.

Referring to FIGS. 1 and 1A, there is shown an embodiment of the invention which is generally indicated at 1, and referred to as a joining device. The joining device 1 can be fabricated from a pair of standards 3 (shown in FIGS. 1 through 4, inclusive, and 9), which contain therein preformed apertures 5 (shown in FIGS. 2 through 4, inclusive, and 9). The apertures 5 are so formed in the pair of standards 3 so that they correspond to like apertures 5 in each standard, (see specifically FIG. 2). Thus, at least one dowel 7 (shown in FIGS. 1 through 4, inclusive, and 9), is fitted through corresponding apertures 5 in the pair of standards 3. When the pair of standards 3 are set upright, the dowel 7 is level, unless a slant is desired for a specific embodiment. The dowel 7 is threaded at opposite ends in opposite directions as shown more specifically at 9 in FIGS. 2, 3 and 9.

In a preferred embodiment of this invention (as shown specifically in FIGS. 3, 4 and 9), the dowel 7 is turned down at both ends forming a shoulder 11. The shoulder 11 is disposed to butt against the inside face 13 of the pair of standards 3. Keepers 15 (shown in FIGS. 1 through 9, inclusive) are provided for being threaded onto threaded ends of the dowel 7. When the keepers 15 are threaded into position on the dowel 7, the keepers 15 abut the outside face 17 of each of the pair of standards 3. Thus, in the preferred embodiment where the dowel 7 is provided with a shoulder 11, each of the pair of standards 3 are respectively supported both on the inside face and the outside face, 13 and 17 respectively, by the shoulders 11 and keepers 15. In this manner, the pair of standards 3 are securely held in position spaced apart from each other by the length of the dowel 7 fitting between the inside faces 13 of the pair of standards 3. By using more than one dowel 7, it can be seen that the structure secured thereby is not only just as easily fabricated but it is more secure and can even support articles within its body by use of the dowels 7 themselves.

The advantage of the dowel 7 having oppositely threaded ends 9 is the fact that one workman can easily join together a free standing fixture without the aid of an additional workman. The method of so joining together this free standing fixture is shown in FIGS. 9A through 9F. Specifically, (as shown in FIG. 9A), a workman initially selects one of the pair of standards 3 and inserts one end of a first of the at least one dowels 7 into a selected aperture 5 therein. Next, (as shown in FIG. 9A), a keeper 15 is spun onto one of the oppositely threaded ends 9 extending through the selected apertures of one of the pair of standards 3 so that the keeper 15 provides a snug fit against the outside face 17 of the selected one of the pair of standards 3. The next (as shown in FIG. 9C) and each succeeding one of the dowels 7 are successively inserted into a next succeeding selected aperture 5 in the selected one of the pair of standards 3 and the step of spinning a keeper 15 onto one of the oppositely threaded ends 9 extending through the next selected aperture 5 is repeated.

When all of the preselected dowels 7 are, in their turn, inserted through their selected apertures 5 and held therein by a corresponding keeper 15 snugly threaded on the threaded portion of the dowel 7, then the second one of the pair of standards 3 is moved toward the free and opposite ends of the dowels already fitted into the selected one of the pair of dowels so that the apertures 5 line up with the free and opposite ends of the dowels 7, (as shown in FIG. 9D).

As shown in FIG. 9E, each of the free and oppositely threaded ends 9 of the dowels 7 are inserted through the corresponding apertures 5 in the second one of the pair of standards and one by one each of the keepers 15 are in turn spun onto an oppositely threaded end 9 of the dowels 7 until snug against the outside face 17 of the second one of the pair of standards 3.

When this is accomplished, (as shown in FIG. 9F), the dowels 7 are each successively rotated or turned with one hand whereby both keepers 15 are tightly secured in place. It is to be noted that all dowels 7 and all keepers 15 are identical unless preferred otherwise for design or other purposes. In this manner, the pair of standards 3 are held in place and form a free standing fixture by the dowel 7.

It is to be noted that the keepers 15 do not have to be fully threaded onto each of the oppositely threaded ends 9 of the dowel 7, but that due to the oppositely threaded ends 9 of the dowel 7, the workman need only rotate the dowel 7 and the keepers 15 adjacent the second one of the pair of standards 3 will be moved toward the respective outside faces 17 of the second one of the pair of standards 3.

In a specific embodiment, (as shown in FIG. 1A), the joining device includes two dowels 7 which are set apart for supporting a shelf or at least one article 40.

The joining device 7 further includes in another embodiment a rib 19 (shown in FIGS. 1 and 2). The rib 19 is supported on either end in a corresponding preformed cavity, groove or hole 21 (see FIG. 2). The cavity 21 is sufficiently deep to accept the rib 19 and support the same when each of the pair of standards 3 are held together in place by the keepers 15 being securely threaded onto the oppositely threaded ends 9 of the dowel 7. With the rib 19 spaced in position with the dowels 7, as shown in FIGS. 1 and 2, an article can be supported thereon in a nonslipping position. Thus, the joining device 1 forms a rack for supporting one or more of the articles.

The rib 19 is inserted in the joining device 1 by fixing one end of the rib 19 in the preformed groove 21 of the first selected one of the pair of standards 3 and supporting the rib 19 while fitting the free ends of the dowels 7 into the apertures 5 in the second one of the pair of standards 3 until the opposite free end of the rib 19 is supported in the preformed aperture 21 in the second one of the pair of standards 3.

In a specifically preferred embodiment of the rack described above, (as shown in FIGS. 1 and 2), the rib 19 is so disposed with respect to two dowels 7 so that the joining device 1 forms a wine rack (unnumbered). In this embodiment, a first of at least one dowels 7 is disposed in position to support the neck of a wine or other bottle 23 and a second of at least one dowels 7 is disposed to support the base of the wine bottle 23. The rib 19 (or if preferred another of at least one dowels 7) is then located below the side of the wine bottles 23 so that the wine bottles 23 also bear against the rib 19. A shelf 40 is shown supported upon batting which is attached to the inside face 13 of the pair of standards 3 by nails or screws as shown or by adhesive or other similar method as is well known in the art. This shelf 40 can be used to hold additional articles thereon.

The keepers 15 are shown in FIGS. 1 through 3, inclusive, 5, 6, and 9, as a wooden nut formed with internal threads 25 of at least two full turns.

In another embodiment of the keepers 15, as shown in FIGS. 4, 7 and 8, the keepers 15 are thin pieces of material 26 having a concentric opening 27 in the center thereof, which is slightly larger than the root diameter (unnumbered) of the oppositely threaded ends 9 of the dowel 7.

As shown specifically in FIG. 7, the thin piece of material 26 can be stamped out in any desired aesthetic form, for example, as shown in the form of a daisy 29. The thin material 26, whether in the form of a daisy 29 or a square, circle or rectangle (none of which is shown specifically in the drawings) or in any other desired form, are thus threaded onto the oppositely threaded ends 9 of the dowel 7 in the manner described above to secure the pair of standards 3 in place and held thereat by the shoulder 11 of the at least one dowels 7 fitted tightly against the inside faces 13 of each of the pair of standards 3 by means of the keepers 15.

The keepers 15, when fabricated, form a thin piece of material 26, and can be fabricated of any hard or semi-hard materials, including neoprene, rubber and other like materials. Of course, wood and sheet metal are the suggested materials to be used.

In a specific embodiment of the joining device 1, the pair of standards 3 can be each notched, as shown at 31 (shown in FIGS. 1 and 2) at the upper portion 33 of each of the pair of standards 3. The upper portion 33 of each of the pair of standards 3 can be considered to be anywhere else along the top edge and, as shown in FIG. 2, can be offset from the middle of each of the pair of standards 3 when the upper portion 33 is an arc (unnumbered).

The notched portion 31 of the pair of standards 3 support therein a face board 35 in an upright position.

The face board 35 can carry thereon desired logo or advertisement when the structure is fabricated for use as a display item such as a wine rack (unnumbered), which is used in a vendor's display.

In a preferred embodiment, a face board can also be correspondingly notched 37 at its lower portion 39 (as shown in FIG. 2).

In this manner, the face board 35 can be fitted at its notched portion 37 into and over the notched portion 31, on each of the pair of standards 3.

Thus, in this manner, the face board 35 is held in a symmetrically centered position in the joining device 1, which prevents the face board 35 from being moved when secured therein.

What is claimed is:

1. A joining device for quickly and easily connecting together standards which comprises:
   a. a pair of standards having corresponding preformed apertures and cavities therein;
   b. at least two dowels each spaced apart, one being lower than the other and having a reduced section adjacent shoulders at both ends, said reduced sections being threaded in opposite directions;
   c. at least one pair of keepers provided for each of the at least two dowels for being threaded onto each end of the at least two dowels; and
   d. at least one rib spaced apart from and below said at least two dowels;
   whereby the first one of the pair of standards is selected and one end of each of the at least two dowels is inserted through succeeding ones of the corresponding preformed apertures provided therein and one of each of said at least one pair of keepers is started to be screwed onto each end of the at least two dowels which has been inserted through the corresponding preformed apertures in said selected one of the pair of standards, then, the second one of the pair of standards is moved toward the free and opposite ends of the at least two dowels said free and opposite ends of the at least two dowels being inserted through said preformed apertures therein, while said ribs are each positioned in respective ones of said preformed cavities, and the remaining one of each of said at least one pair of keepers is started to be screwed onto the corresponding free ends of the at least two dowels, and succeeding ones of the at least two dowels are each rotated until said shoulders butt tightly against said first one and second one of the pair of standards, forming a free standing fixture for supporting one or more articles with said at least two dowels and at least one rib.

* * * * *